US009426023B2

(12) United States Patent
Chennamsetty et al.

(10) Patent No.: US 9,426,023 B2
(45) Date of Patent: Aug. 23, 2016

(54) AUTOMATIC RECONFIGURATION OF NETWORK PARAMETERS DURING FILE SYSTEM FAILOVER

(71) Applicant: International Business Machines Corporation, Armonk, NY (US)

(72) Inventors: Ramamohan Chennamsetty, Highland, NY (US); Vinit Jain, Austin, TX (US); Nataraj Nagaratnam, Cary, NC (US); Sandeep R. Patil, Pune, IN (US); Riyazahamad M. Shiraguppi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 14/454,750

(22) Filed: Aug. 8, 2014

(65) Prior Publication Data
US 2016/0043894 A1  Feb. 11, 2016

(51) Int. Cl.
H04L 12/46  (2006.01)
H04L 12/24  (2006.01)
H04L 12/939  (2013.01)
H04L 12/931  (2013.01)
H04L 12/703  (2013.01)

(52) U.S. Cl.
CPC ........ H04L 41/0672 (2013.01); H04L 12/4641 (2013.01); H04L 49/354 (2013.01); H04L 49/557 (2013.01); H04L 49/65 (2013.01); H04L 45/28 (2013.01)

(58) Field of Classification Search
None
See application file for complete search history.

(56) References Cited

U.S. PATENT DOCUMENTS

| 6,223,218 | B1 | 4/2001 | Iijima et al. | |
| 7,983,258 | B1 | 7/2011 | Ruben et al. | |
| 8,064,469 | B2 | 11/2011 | Webster | |
| 8,938,516 | B1* | 1/2015 | Thathapudi | H04L 12/4641 709/208 |
| 2007/0230457 | A1 | 10/2007 | Kodera et al. | |
| 2007/0274321 | A1 | 11/2007 | Jonsson et al. | |
| 2008/0186980 | A1 | 8/2008 | Luthra et al. | |
| 2008/0189764 | A1* | 8/2008 | Gronholm | G06F 15/16 726/3 |
| 2008/0298373 | A1 | 12/2008 | Lapuh et al. | |
| 2011/0110266 | A1* | 5/2011 | Li | H04L 47/2491 370/253 |
| 2013/0103787 | A1* | 4/2013 | Glover | H04L 67/1002 709/217 |
| 2014/0006465 | A1 | 1/2014 | Davis et al. | |

* cited by examiner

Primary Examiner — Ian N Moore
Assistant Examiner — Lakeram Jangbahadur
(74) Attorney, Agent, or Firm — Robert C. Bunker; Gail H. Zarick

(57) ABSTRACT

According to one exemplary embodiment, a method for automatic network reconfiguration associated with a failover event is provided. The method may include instructing a file system to capture a plurality of attributes associated with a plurality of data following the failover event, whereby the plurality of attributes comprises a fileset identifier, a first gateway node identifier, and a second gateway node identifier. The method may include determining, based on the captured fileset identifier, a virtual local area network associated with the fileset, whereby the determined virtual area network includes at least one software defined network switch. The method may include reconfiguring the at least one software defined network switch to stop sending a plurality of network traffic to the first gateway node and to start sending the plurality of network traffic to the second gateway node, whereby the plurality of network traffic is associated with the fileset.

20 Claims, 6 Drawing Sheets

AUTOMATIC RECONFIGURATION OF NETWORK PARAMETERS DURING FILE SYSTEM FAILOVER

BACKGROUND

The present invention relates generally to the field of computing, and more particularly to automatic network reconfiguration.

In order to provide high performance data access across networks, data may be duplicated and cached at multiple sites. File systems may be employed to handle multiple data cache sites and mask wide-area network latencies and outages, allowing data access and modifications even when remote storage sites are unavailable.

SUMMARY

According to one exemplary embodiment, a method for automatic network reconfiguration associated with a failover event is provided. The method may include instructing a file system to capture a plurality of attributes associated with a plurality of data following the failover event, whereby the plurality of attributes includes a fileset identifier associated with a fileset, a first gateway node identifier associated with a first gateway node, and a second gateway node identifier associated with a second gateway node. The method may also include determining, based on the captured fileset identifier, a virtual local area network (VLAN) associated with the fileset, whereby the determined virtual area network includes at least one software defined network (SDN) switch. The method may then include reconfiguring the at least one software defined network switch to stop sending a plurality of network traffic to the first gateway node corresponding to the first gateway node identifier and to start sending the plurality of network traffic to the second gateway node corresponding to the second gateway node identifier, whereby the plurality of network traffic is associated with the fileset.

According to another exemplary embodiment, a computer system for automatic network reconfiguration associated with a failover event is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include instructing a file system to capture a plurality of attributes associated with a plurality of data following the failover event, whereby the plurality of attributes includes a fileset identifier associated with a fileset, a first gateway node identifier associated with a first gateway node, and a second gateway node identifier associated with a second gateway node. The method may also include determining, based on the captured fileset identifier, a virtual local area network associated with the fileset, whereby the determined virtual area network includes at least one software defined network switch. The method may then include reconfiguring the at least one software defined network switch to stop sending a plurality of network traffic to the first gateway node corresponding to the first gateway node identifier and to start sending the plurality of network traffic to the second gateway node corresponding to the second gateway node identifier, whereby the plurality of network traffic is associated with the fileset.

According to yet another exemplary embodiment, a computer program product for automatic network reconfiguration associated with a failover event is provided. The computer program product may include one or more computer-readable storage devices and program instructions stored on at least one of the one or more tangible storage devices, the program instructions executable by a processor. The computer program product may include program instructions to instruct a file system to capture a plurality of attributes associated with a plurality of data following the failover event, whereby the plurality of attributes includes a fileset identifier associated with a fileset, a first gateway node identifier associated with a first gateway node, and a second gateway node identifier associated with a second gateway node. The computer program product may also include program instructions to determine, based on the captured fileset identifier, a virtual local area network (VLAN) associated with the fileset, whereby the determined virtual area network includes at least one software defined network (SDN) switch. The computer program product may then include program instructions to reconfigure the at least one software defined network switch to stop sending a plurality of network traffic to the first gateway node corresponding to the first gateway node identifier and to start sending the plurality of network traffic to the second gateway node corresponding to the second gateway node identifier, whereby the plurality of network traffic is associated with the fileset.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
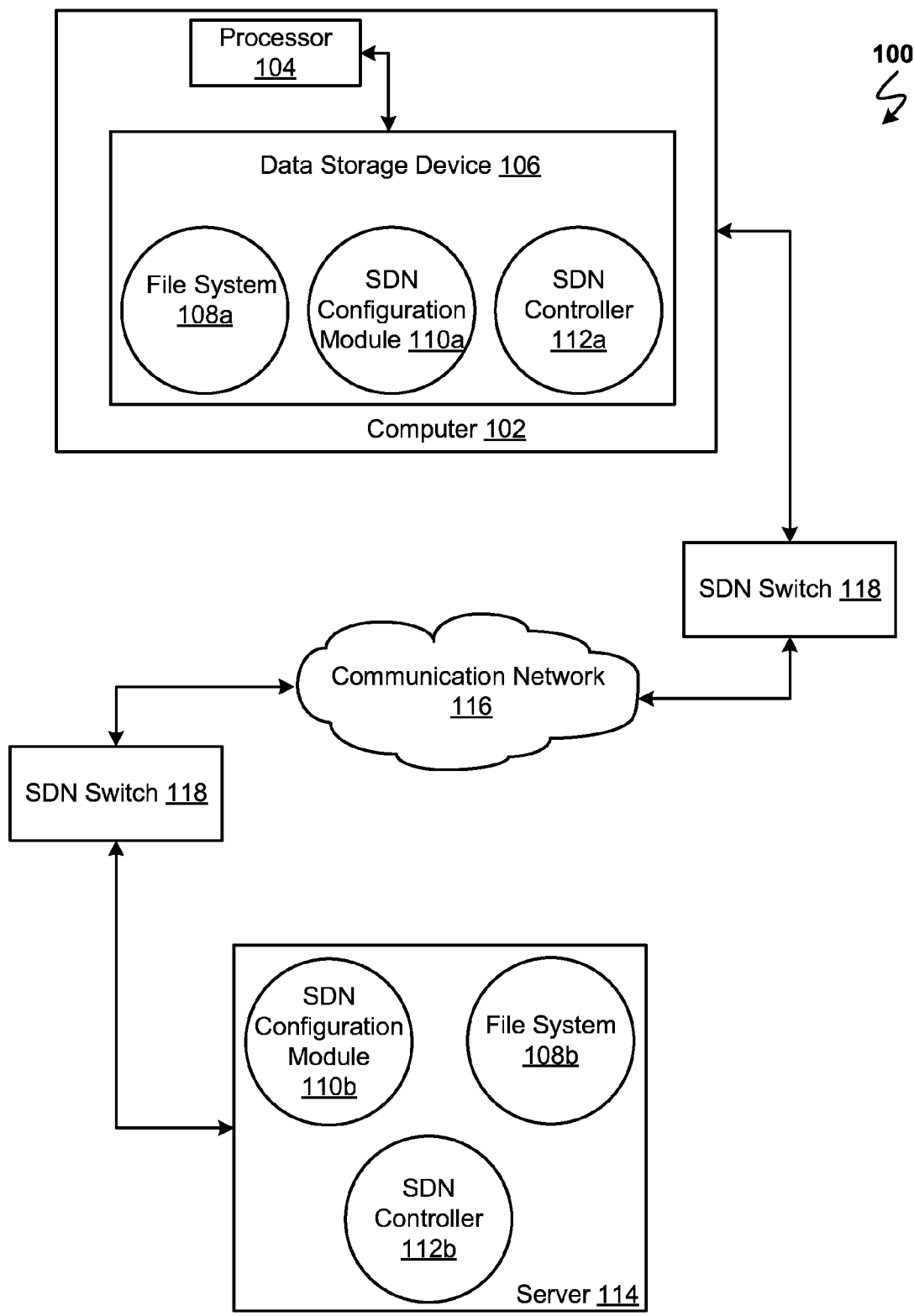
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for automatic network parameter reconfiguration during file system data failover.

As described above, in order to provide high performance data access across networks, data may be duplicated and cached at multiple sites. Clustered file systems (e.g., Panache or IBM General Parallel File System™) may be employed to handle data distributed at multiple data sites (i.e., servers) and mask wide-area network latencies and outages, allowing data access and modifications even when remote storage sites are unavailable. Data stored at data sites may be grouped together as a fileset. Grouping data into filesets provides a way to partition file system namespace into more manageable units. Data in a single fileset may reside in one or more data storage pools.

When a client application (e.g., a web browser) first attempts to access a fileset (e.g., a video file to be streamed over a network), the fileset may be fetched from the fileset's home data site (i.e., a server that persistently stores the fileset) and copied as a cached copy to another data site. Subsequent requests for the fileset may be served from the cached copy of the fileset stored at a local data site and as such may reduce or eliminate the need of wide-area network bandwidth. The file system may assign a node (i.e., one or more interconnected servers) as an owner gateway node to a cached fileset at a data site. The gateway node may take responsibility for communicating with the home data site for the fileset assigned to the gateway node. The gateway node may communicate with the home data site to ensure that the copy of the fileset associated with the gateway node matches the fileset at the home site.

At each data site, software defined network switches may be employed to manage network traffic between data sites inside the network and outside the network. Software defined switches may comprise a control plane that makes decisions about where network traffic may be sent and a data plane that forwards network traffic to a destination. There are various deployment methods for software defined network switches. One deployment method comprises a central software defined network controller that controls multiple software defined network switches. These software defined network switches may be configured via the central software defined network controller to permit gateway nodes to communicate with the home data site for the fileset assigned to the gateway node. Switches in the path between a gateway node and a home data site may be grouped into a virtual local area network (VLAN) whereby the VLAN may be configured to forward network traffic to the gateway node with the required security and quality of service.

In some instances the file system may automatically reassign filesets from one gateway node to another gateway node (i.e., a failover event). After a failover event, the new gateway node may take responsibility for communication associated with the fileset. Failover may occur, for example, when the file system on a gateway node fails or if the gateway node has some other failure making the gateway node inaccessible. Failover events may be handled by the file system automatically to reassign gateway nodes to filesets. System administrators may not be informed of a failover event at the file system level. Additionally, the network level (e.g., VLAN and network switches) may not be aware of a failover event and thus may not reconfigure the network to direct fileset traffic to the new gateway node. A system administrator may eventually detect data from some filesets not progressing that may be indicative of a failover event. The failover may require the network level to then be reconfigured manually in order to allow data to progress again. However, relying on such a manual reconfiguration, once a system administrator has noticed a lack of data progression, may be slow and may be prone to error. Therefore, it may be advantageous to, among other things, have an automated method for reconfiguring the network in response to file system data failover events.

Referring now to FIG. 1, an exemplary networked computer environment 100 in accordance with one embodiment is depicted. The networked computer environment 100 may include a computer 102 with a processor 104 and a data storage device 106 that is enabled to run a file system 108a, a software defined network (SDN) configuration module 110a, and an SDN controller 112a. The networked computer environment 100 may also include a server 114 that is enabled to run a file system 108b, an SDN configuration module 110b, and an SDN controller 112b. Additionally, the networked computer environment 100 may include a communication network 116 and a plurality of SDN switches 118. The networked computer environment 100 may include a plurality of computers 102 and servers 114, only one of which is shown for illustrative brevity. The communication network 116 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 114 via the communications network 116 and SDN switches 118. The communications network 116 may include connections, such as wire, wireless communication links, or fiber optic cables. As will be discussed with reference to FIG. 6, server computer 114 may include internal components 800a and external components 900a, respectively and client computer 102 may include internal components 800b and external components 900b, respectively. Client computer 102 may be, for example, a mobile device, a telephone, a PDA, a netbook, a laptop computer, a tablet computer, a desktop computer, or any type of computing device capable of running a program and accessing a network.

A program, such as a file system 108a, b, SDN configuration module 110a, b, and SDN controller 112a, b may run on the client computer 102 or on the server computer 114. The file system 108a, b, SDN configuration module 110a, b and SDN controller 112a, b may be used to automatically reconfigure network parameters in SDN switches 118 in the event of a failover. The file system 108a, b, SDN configuration module 110a, b and SDN controller 112a, b are explained in further detail below with respect to FIGS. 2-5.

Figure 2:
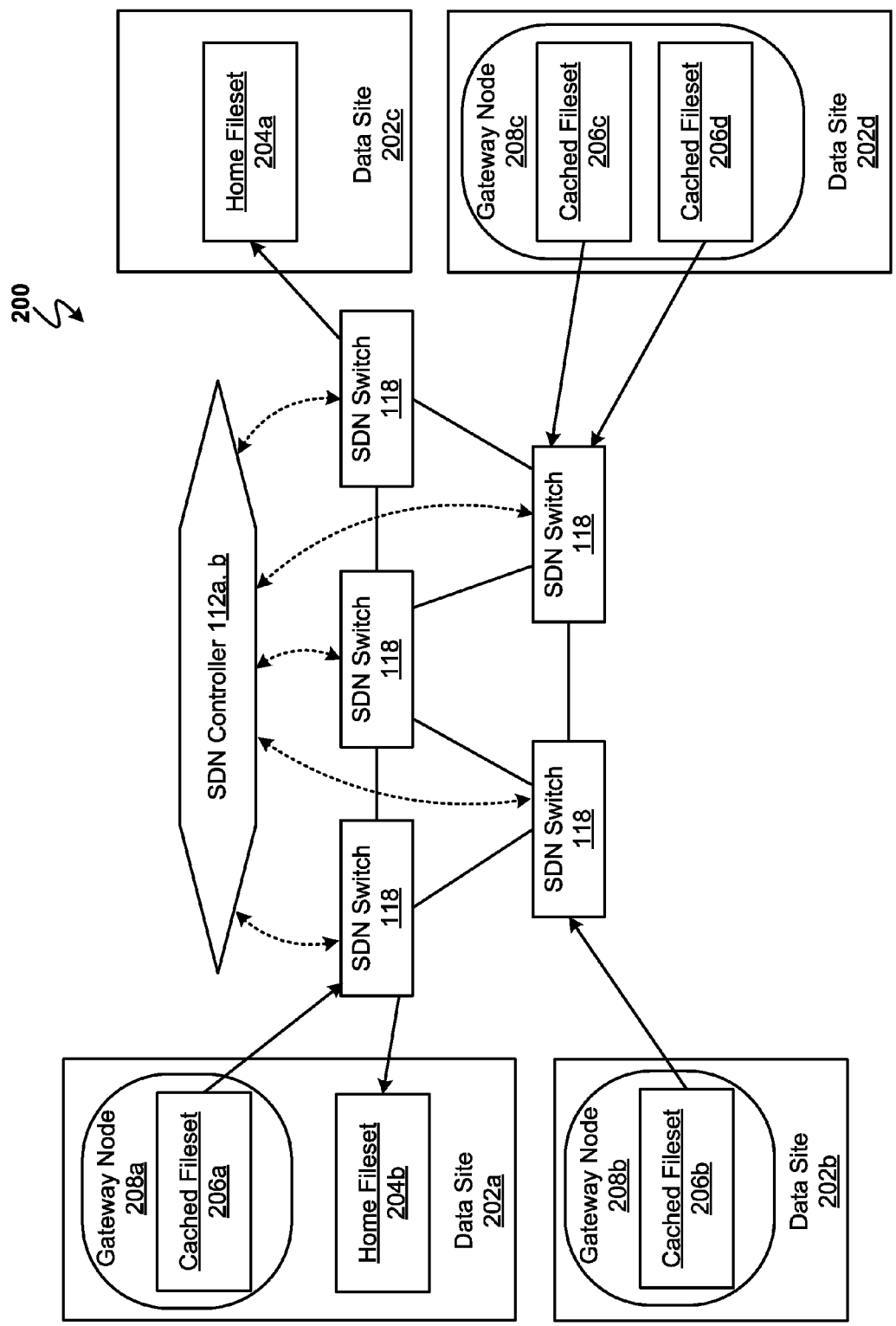
FIG. 2 is a block diagram illustrating a clustered file system according to at least one embodiment.

Referring now to FIG. 2, a block diagram illustrating a file system 108a, b (FIG. 1) organized as a clustered file system 200 (e.g., Panache) for managing files distributed across a network according to at least one embodiment is depicted. The clustered file system 200 may utilize clusters of servers as data sites 202a-d to store filesets. Filesets may include home filesets 204a-b (i.e., the persistent primary copy of the fileset) stored on a server at a data site 202a-c and cached filesets 206a-d (i.e., a secondary copy of the fileset that may be synchronized to the primary copy) stored on gateway node 208a-c servers at the data site 202a-d. Gateway nodes 208a-c assigned cached filesets 206a-d may be responsible for communicating with the servers that contain the home fileset 204a-b corresponding to the assigned cached fileset 206a-d. For example, home fileset 204a stored on a server at data site 202c may correspond with cached fileset 206a assigned to gateway node 208a at data site 202a. Thus, gateway node 208a may be responsible for communicating with the server storing home fileset 204a to keep the assigned cached fileset 206a in sync.

Additionally, gateway nodes 208a-c may communicate to servers storing home filesets 204a-b via a network, such as a VLAN including multiple SDN switches 118. According to at least one embodiment, the network linking gateway nodes 208a-c to servers storing home filesets 204a-b may include multiple software defined SDN switches 118 controlled by a SDN controller 112a, b.

In the event that a gateway node's 208a-c condition triggers the clustered file system 200 to process a failover (e.g., the gateway node's 208a-c file system failed), the clustered file system 200 may reassign the cached fileset 206a-d from the failed gateway node 208a-c to a new gateway node 208a-c. For example, if gateway node 208c experiences a hardware failure, the clustered file system 200 may determine to process a node failover and reassign cached fileset 206d from failed gateway node 208c to new gateway node 208a.

Figure 3:
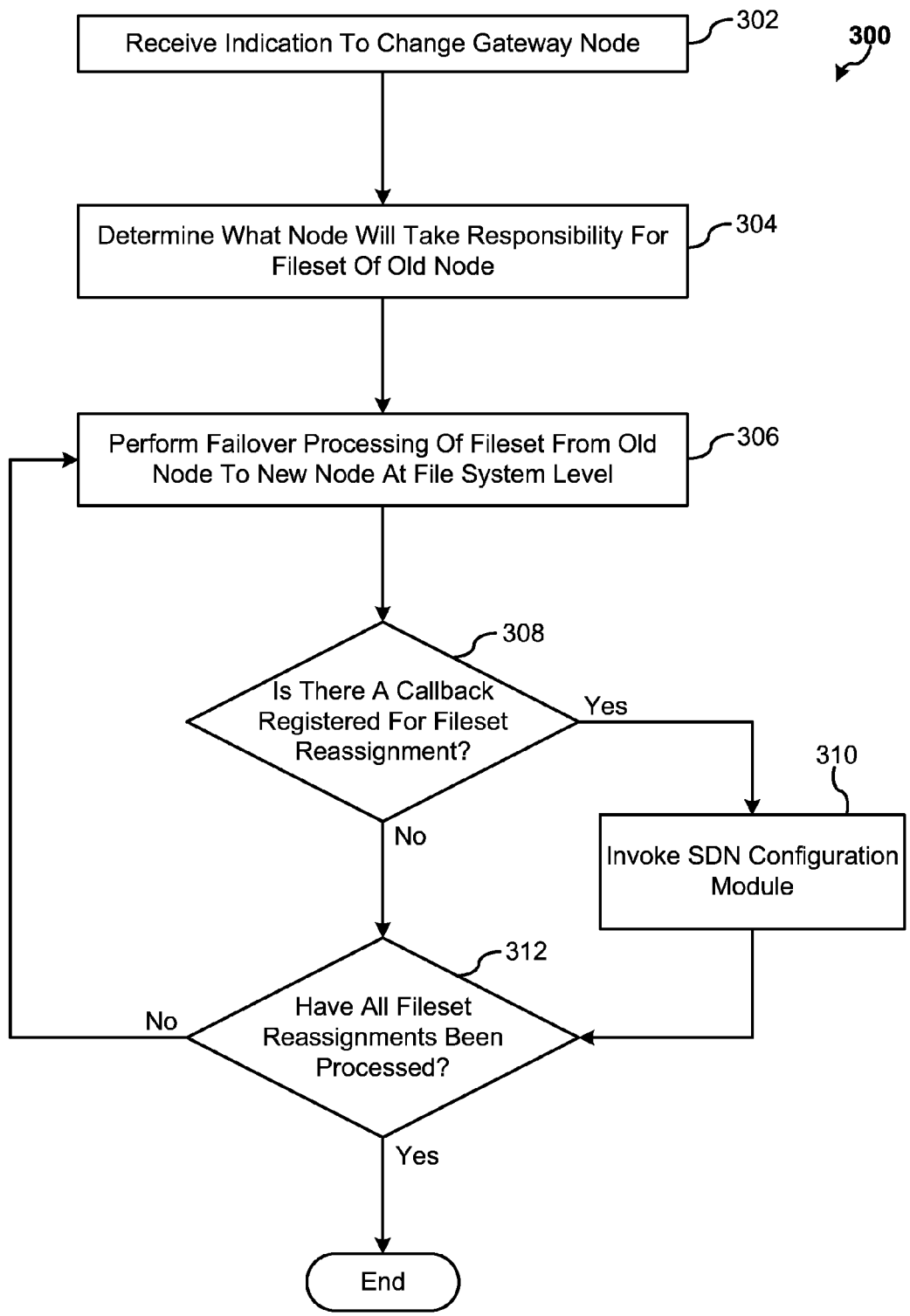
FIG. 3 is an operational flow chart illustrating a failover process by the file system according to at least one embodiment.

Referring now to FIG. 3, an operational flow chart illustrating the exemplary failover process 300 by the file system 108a, b (FIG. 1) according to at least one embodiment is depicted.

At 302, the failover process 300 may receive an indication that a cache site gateway node 208a-c (FIG. 2) for a fileset (e.g., 206a: FIG. 2) may need to be changed. For example, a cache site gateway node 208a-c (FIG. 2) may need to be changed when the file system on a gateway node 208a-c (FIG. 2) fails or where the gateway node 208a-c (FIG. 2) has a hardware failure making the gateway node 208a-c (FIG. 2) inaccessible is detected. A fileset (e.g., 206a: FIG. 2) may also be reassigned to a new gateway node 208a-c (FIG. 2) when new gateway nodes 208a-c (FIG. 2) are added in a cluster of network connected servers, thus requiring rebalancing and redistribution of cached filesets 206a-d (FIG. 2). Additionally, a fileset (e.g., 206a: FIG. 2) may be reassigned to a new gateway node 208a-c (FIG. 2) when a gateway node 208a-c (FIG. 2) is under heavy load and some of the cached filesets 206a-d (FIG. 2) of the overloaded gateway node 208a-c (FIG. 2) may be moved to another gateway node 208a-c (FIG. 2).

Next, at 304, the failover process 300 may determine what gateway node 208a-c (FIG. 2) may take over responsibility for servicing requests to access the fileset (e.g., 206a: FIG. 2). According to at least one embodiment, the failover process 300 may select one or more gateway nodes 208a-c (FIG. 2) to take over a fileset (e.g., 206a: FIG. 2) based on predefined reassignment policies. For example, a predefined reassignment policy may include load balancing where a high demand fileset may be moved to a gateway node 208a-c (FIG. 2) that has low load. Additionally, according to at least one embodiment, the failover process 300 may generate a reassignment list delineating each reassigned fileset (e.g., 206a: FIG. 2) and the new gateway node 208a-c (FIG. 2) that the failover process 300 assigned to the fileset (e.g., 206a: FIG. 2). For example, a reassignment list may include a data structure, such as a linked list, whereby each data field of the linked list contains a tuple identifying the fileset (e.g., 206a: FIG. 2) and the new gateway node 208a-c (FIG. 2) assigned to the fileset (e.g., 206a: FIG. 2).

Then, at 306, an entry in the reassignment list may be used to process a failover response at the clustered file system 200 (FIG. 2) level. According to at least one embodiment, the failover process 300 may read a single entry in the reassignment list to ascertain the fileset name and the new gateway node 208a-c (FIG. 2) necessary to change fileset (e.g., 206a: FIG. 2) ownership from the old gateway node 208a-c (FIG. 2) to the new gateway node 208a-c (FIG. 2). When the clustered file system (200 FIG. 2) changes fileset (e.g., 206a: FIG. 2) ownership, a reassignment callback may be generated by the clustered file system 200 (FIG. 2) that may capture data related to the failover event.

At 308, the failover process 300 may determine if a callback for a fileset reassignment event is registered. Clustered file systems 200 (FIG. 2) may utilize a callback feature for, among other things, error reporting and monitoring. Such a feature may enable an administrator to register programs and scripts that may be executed by the clustered file system 200 (FIG. 2) when a specified event may be detected. According to at least one embodiment, a callback may be added to the clustered file system 200 (FIG. 2) to capture data related fileset reassignment events (i.e., failover events) and collect reassignment information attributes such as a fileset identifier (e.g., fileset name) corresponding to the fileset (e.g., 206a: FIG. 2), an old gateway node identifier (e.g., old gateway node name) corresponding to the old gateway node 208a-c (FIG. 2), and a new gateway node identifier (e.g., new gateway node name) corresponding to the new gateway node 208a-c (FIG. 2) to use as reassignment parameters. According to at least one embodiment, the failover process 300 may search the callbacks registered with the clustered file system 200 (FIG. 2) to determine if a failover callback script or program may be configured to trigger in the event of failover.

If the failover process 300 has determined that a callback script of program has been registered for a failover event, the failover process 300 may invoke the callback script or program, such as the SDN configuration module 110a, b (FIG. 1) at 310, in response to a failover event. Reassignment parameters (e.g., fileset identifier, old gateway node identifier, and new gateway node identifier) associated with an entry in the reassignment list may then be forwarded to the SDN configuration module 110a, b (FIG. 1) as discussed below with reference to FIG. 4.

However, if the failover process 300 has determined that a callback was not registered for a fileset reassignment event, or if the failover process 300 invoked the SDN configuration module 110a, b (FIG. 1) at 310, the failover process 300 may check if all entries in the reassignment list have been processed at 312. If all of the fileset reassignments have not been processed yet, the method may return to 306 to process the next entry in the reassignment list. However, if all entries in the reassignment list have been processed, the method may end.

Figure 4:
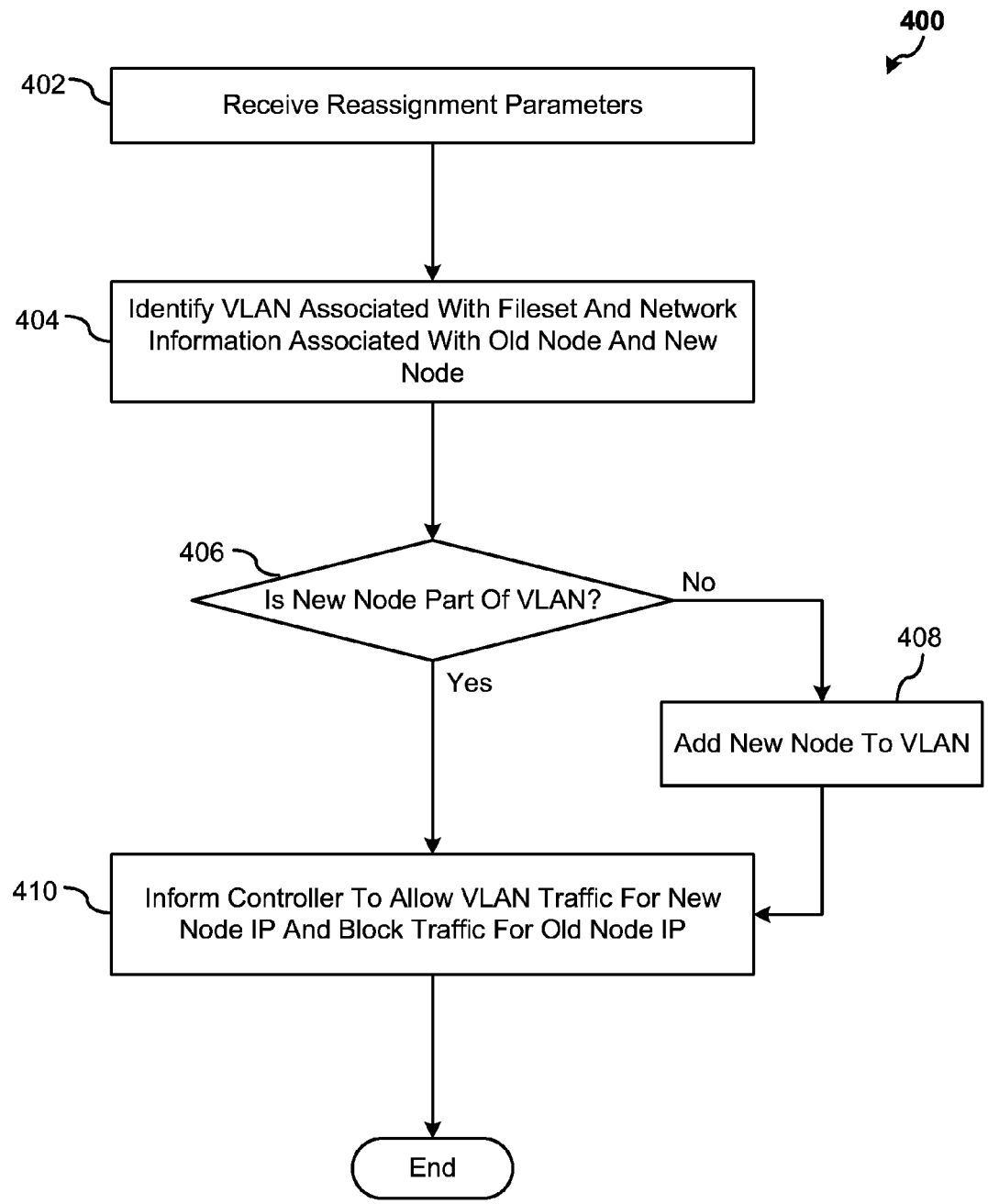
FIG. 4 is an operational flow chart illustrating a reassignment process by the software defined network module according to at least one embodiment.

Referring now to FIG. 4, an operational flow chart illustrating the exemplary reassignment process 400 by the SDN configuration module 110a, b (FIG. 1) according to at least one embodiment is depicted. According to at least one embodiment, the SDN configuration module 110a, b (FIG. 1) may be a program stored in a data repository that is accessible by the clustered file system 200 (FIG. 2). At 402, the reassignment process 400 of the SDN configuration module 110a, b (FIG. 1) may receive reassignment parameters (e.g., fileset identifier, old gateway node identifier, and new gateway node identifier) from failover process 300 (FIG. 3).

Next, at 404, the reassignment process 400 may determine what virtual local area network (VLAN) is currently associated with the fileset (e.g., 206a: FIG. 2). For example, data pertaining to the VLAN associated with a fileset (e.g., 206a: FIG. 2) may be stored in a data structure, such as an array, that the reassignment process 400 may query using the fileset identifier. The network information associated with the old gateway node 208a-c (FIG. 2) and new gateway node 208a-c (FIG. 2) may also be identified by the reassignment process 400. Network information may include, for example, security protocols and other quality of service attributes. According to at least one embodiment, network information may be stored in gateway nodes 208a-c (FIG. 2) in a data structure, such as an array, where the network information may be accessed and retrieved by the reassignment process 400 using the old gateway node identifier and new gateway node identifier.

Then, at 406, the reassignment process 400 may determine if the new gateway node (e.g., 208b: FIG. 2) is already part of the VLAN associated with the fileset. According to at least one embodiment, the reassignment process 400 may use network VLAN configuration commands to retrieve a list of gateway nodes 208*a*-*c* (FIG. 2) that are part of the VLAN. Using the retrieved list of gateway nodes 208*a*-*c* (FIG. 2) that are part of the VLAN, the reassignment process 400 may determine that the new gateway node (e.g., 208*b*: FIG. 2) is already part of the VLAN if the new gateway node (e.g., 208*b*: FIG. 2) searching the list of gateway node identifiers retrieved by VLAN configuration commands for a gateway node identifier that matches the new gateway node identifier.

If the reassignment process 400 determines that the new gateway node (e.g., 208*b*: FIG. 2) is not part of the VLAN (e.g., the new gateway node identifier is not present on the retrieved list of gateway node identifiers), the reassignment process 400 may add the new gateway node (e.g., 208*b*: FIG. 2) to the VLAN at 408. According to at least one embodiment, the reassignment process 400 may add the new gateway node (e.g., 208*b*: FIG. 2) to the VLAN by using network VLAN configuration commands in conjunction with the new gateway node identifier.

However, if the reassignment process 400 determines that the new gateway node (e.g., 208*b*: FIG. 2) is already part of the VLAN at 406, or if the new gateway node (e.g., 208*b*: FIG. 2) was added to the VLAN at 408, the reassignment process 400 may inform the SDN controller 112*a, b* (FIGS. 1, 2) to stop sending network traffic relating to the fileset (e.g., 206*a*: FIG. 2) to the old gateway node (e.g., 208*a*: FIG. 2) and to start sending network traffic relating to the fileset (e.g., 206*a*: FIG. 2) to the new gateway node (e.g., 208*b*: FIG. 2) at 410. Additionally, the reassignment process 400 may send reconfiguration parameters (e.g., VLAN identifier, old gateway node IP, new gateway node IP, and network information) to the SDN controller 112*a, b* (FIGS. 1, 2) for use by the reconfiguration process 500 (FIG. 5) and then the reassignment process 400 may end.

Figure 5:
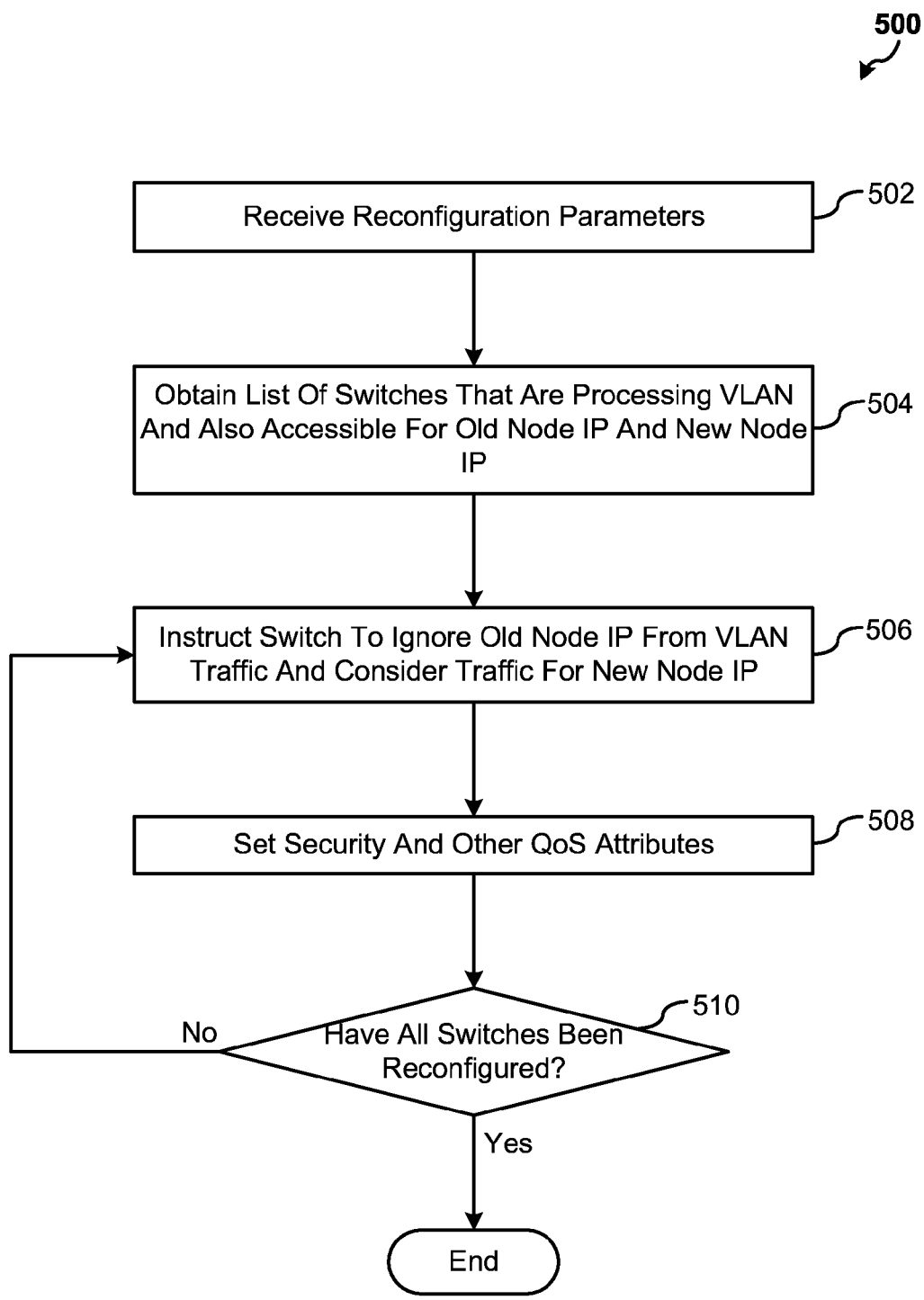
FIG. 5 is an operational flow chart illustrating a reconfiguration process by the software defined network controller according to at least one embodiment.

Referring now to FIG. 5, an operational flow chart illustrating the exemplary reconfiguration process 500 executed at the program layer of the SDN controller 112*a, b* (FIGS. 1, 2) according to at least one embodiment is depicted. Beginning at 502, the reconfiguration process 500 may receive reconfiguration parameters from the reassignment process 400 (FIG. 4). Reconfiguration parameters may include: a VLAN identifier, an old gateway node IP, a new gateway node IP, and network information. The VLAN identifier may correspond to the VLAN associated with the fileset (e.g., 206*a*: FIG. 2). The old and new gateway node IP parameters may correspond to the IP addresses of the old gateway node (e.g., 208*a*: FIG. 2) and the new gateway node (e.g., 208*b*: FIG. 2) respectively. Network information parameters may correspond to quality of service (QoS) requirements, such as security and data flow attributes, associated with the old gateway node (e.g., 208*a*: FIG. 2) that may be maintained by the SDN switches 118 (FIGS. 1, 2).

Next, at 504, the reconfiguration process 500 may obtain a switch list from the SDN controller 112*a, b* (FIGS. 1, 2) that lists the SDN switches 118 (FIGS. 1, 2) that constitute the VLAN associated with the fileset (e.g., 206*a*: FIG. 2). Additionally, the reconfiguration process 500 may filter the switch list to only include SDN switches 118 (FIGS. 1, 2) that may also be accessible by the old gateway node IP and the new gateway node IP.

Then, at 506, an SDN switch 118 (FIGS. 1, 2) from the switch list may be configured to ignore network traffic for the old gateway node IP and may be configured to accept network traffic for the new gateway node IP. According to at least one embodiment, the reconfiguration process 500 may send commands to the SDN controller 112*a, b* (FIGS. 1, 2) to reconfigure an SDN switch 118 (FIGS. 1, 2) to ignore network traffic for the old gateway node IP and to accept network traffic for the new gateway node IP.

At 508, the SDN switch 118 (FIGS. 1, 2) may also be reconfigured consistent with the received network information parameters. According to at least one embodiment, the received network parameters may be used to reconfigure the SDN switch 118 (FIGS. 1, 2) to ensure that network traffic associated with the fileset (e.g., 206*a*: FIG. 2) that may be directed to the new gateway node (e.g., 208*b*: FIG. 2) meets the QoS requirements of the old gateway node (e.g., 208*a*: FIG. 2). The QoS requirements may comprise security and data flow requirements that may need to be maintained in order to access the fileset (e.g., 206*a*: FIG. 2).

Then, at 510, the reconfiguration process 500 may determine if all SDN switch 118 (FIGS. 1, 2) in the switch list have been reconfigured. If there are still SDN switch 118 (FIGS. 1, 2) that have not been reconfigured in the switch list, the reconfiguration process may return to 506 to reconfigure the next SDN switch 118 (FIGS. 1, 2) in the switch list. However, if all SDN switch 118 (FIGS. 1, 2) in the switch list have been reconfigured, the reconfiguration process 500 may end.

Figure 6:
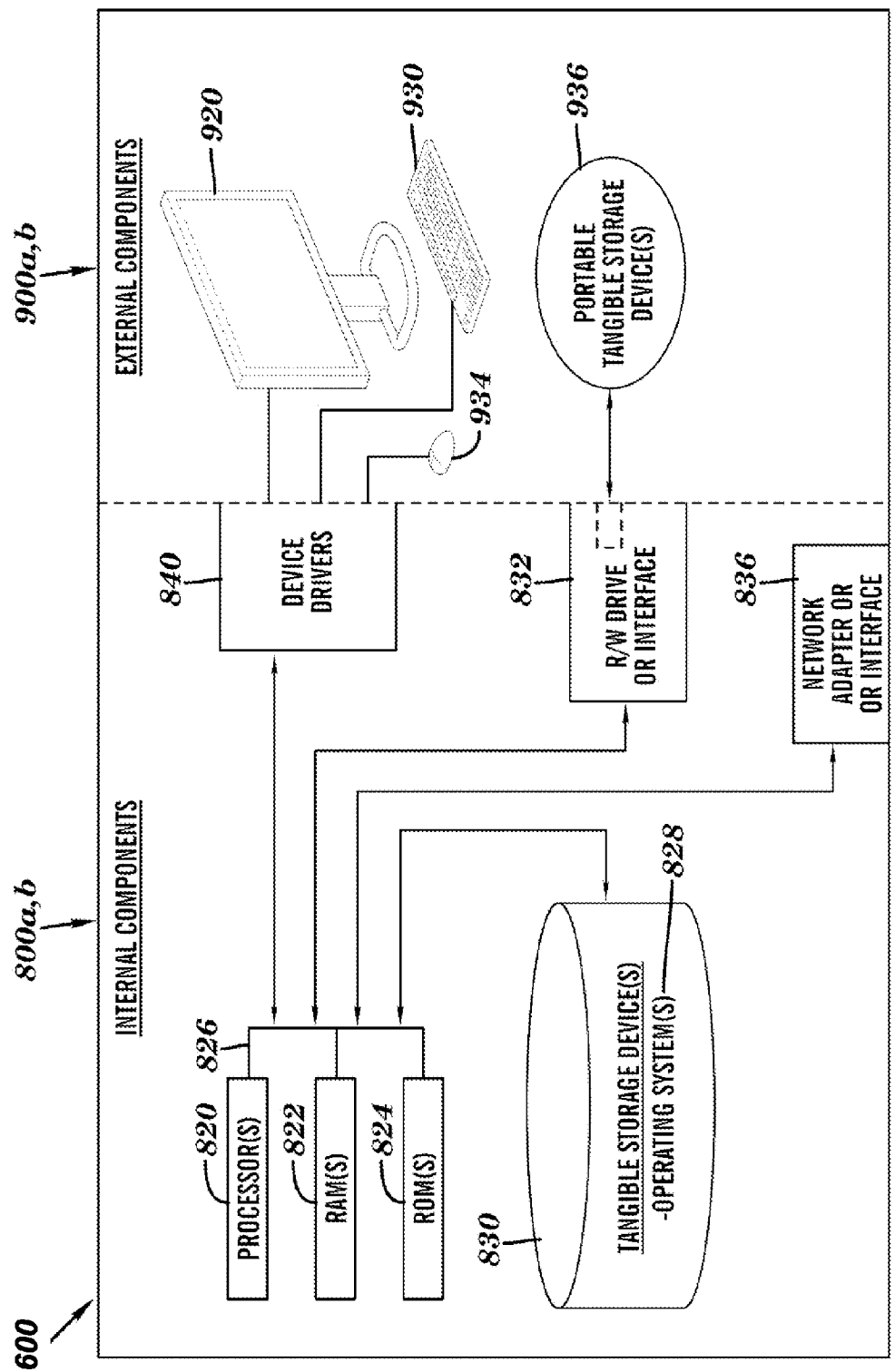
FIG. 6 is a block diagram of internal and external components of computers and servers depicted in FIG. 1 according to at least one embodiment.

FIG. 6 is a block diagram 600 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 114 (FIG. 1) may include respective sets of internal components 800 *a, b* and external components 900 *a, b* illustrated in FIG. 6. Each of the sets of internal components 800 *a, b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a file system 108*a, b* (FIG. 1), SDN configuration module 110*a, b* (FIG. 1), and SDN controller 112*a, b* (FIG. 1), may be stored on one or more computer-readable tangible storage devices 830 for execution by one or more processors 820 via one or more RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The file system 108a, b (FIG. 1), SDN configuration module 110a, b (FIG. 1), and SDN controller 112a, b (FIG. 1) can be stored on one or more of the respective portable computer-readable tangible storage devices 936, read via the respective R/W drive or interface 832 and loaded into the respective hard drive 830.

Each set of internal components 800 a, b may also include network adapters (or switch port cards) or interfaces 836 such as a TCP/IP adapter cards, wireless wi-fi interface cards, or 3G or 4G wireless interface cards or other wired or wireless communication links. The file system 108a (FIG. 1), SDN configuration module 110a (FIG. 1), and SDN controller 112a (FIG. 1) in client computer 102 (FIG. 1) and the file system 108b (FIG. 1), SDN configuration module 110b (FIG. 1), and SDN controller 112b (FIG. 1) in network server computer 114 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the file system 108a (FIG. 1), SDN configuration module 110a (FIG. 1), and SDN controller 112a (FIG. 1) in client computer 102 (FIG. 1) and the file system 108b (FIG. 1), SDN configuration module 110b (FIG. 1), and SDN controller 112b (FIG. 1) in network server computer 114 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed by a software defined network (SDN) controller for automatic network reconfiguration associated with a failover event, the method comprising:

instructing a file system to capture a plurality of attributes associated with a plurality of data following the failover event, wherein the plurality of attributes comprises a fileset identifier associated with a fileset, a first gateway node identifier associated with a first gateway node, and a second gateway node identifier associated with a second gateway node, and wherein the first gateway node and the second gateway node are part of a node cluster;

determining, based on the captured fileset identifier, a virtual local area network (VLAN) associated with the fileset, wherein the determined virtual local area network connects the first gateway node to the second gateway node within the node cluster;

obtaining a software defined network (SDN) switch list from the SDN controller based on the determined virtual local area network, wherein the SDN switch list corresponds to at least one software defined network switch within the determined virtual local area network, and wherein the at least one software defined network switch is configured by the SDN controller; and sending a reconfiguration command to the SDN controller from a program layer, wherein the reconfiguration command instructs the SDN controller to reconfigure the at least one software defined network switch corresponding to the obtained SDN switch list to stop sending a plurality of network traffic to the first gateway node corresponding to the first gateway node identifier and to start sending the plurality of network traffic to the second gateway node corresponding to the second gateway node identifier, and wherein the plurality of network traffic is associated with the fileset.

2. The method of claim 1, further comprising:

determining if the second gateway node is a part of the virtual local area network associated with the fileset; and adding the second gateway node to the virtual local area network associated with the fileset.

3. The method of claim 1, wherein the at least one software defined network switch has a first plurality of quality of service attributes corresponding to the first gateway node and a second plurality of quality of service attributes corresponding to the second gateway node.

4. The method of claim 3, wherein reconfiguring the at least one software defined network switch comprises setting the second plurality of quality of service attributes to match the first plurality of quality of service attributes.

5. The method of claim 1, wherein the instructing a file system to capture the plurality of attributes associated with the plurality of data following the failover event comprises triggering the capture of the plurality of attributes in response to the failover event.

6. The method of claim 1, wherein the failover event comprises the file system reassigning the fileset from the first gateway node to the second gateway node.

7. The method of claim 2, wherein the determining if the second gateway node is a part of the virtual local area network comprises obtaining a list of gateway nodes associated with the virtual area network and searching the list of gateway nodes for the second gateway node identifier.

8. A computer system for automatic network reconfiguration associated with a failover event performed by a software defined network (SDN) controller, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

instructing a file system to capture a plurality of attributes associated with a plurality of data following the failover event, wherein the plurality of attributes comprises a fileset identifier associated with a fileset, a first gateway node identifier associated with a first gateway node, and a second gateway node identifier associated with a second gateway node, and wherein the first gateway node and the second gateway node are part of a node cluster;

determining, based on the captured fileset identifier, a virtual local area network (VLAN) associated with the fileset, wherein the determined virtual local area network connects the first gateway node to the second gateway node within the node cluster;

obtaining a software defined network (SDN) switch list from en the SDN controller based on the determined virtual local area network, wherein the SDN switch list corresponds to at least one software defined network switch within the determined virtual local area network, and wherein the at least one software defined network switch is configured by the SDN controller; and sending a reconfiguration command to the SDN controller from a program layer, wherein the reconfiguration command instructs the SDN controller to reconfigure the at least one software defined network switch corresponding to the obtained SDN switch list to stop sending a plurality of network traffic to the first gateway node corresponding to the first gateway node identifier and to start sending the plurality of network traffic to the second gateway node corresponding to the second gateway node identifier, and wherein the plurality of network traffic is associated with the fileset.

9. The computer system of claim 8, further comprising:
determining if the second gateway node is a part of the virtual local area network associated with the fileset; and
adding the second gateway node to the virtual local area network associated with the fileset.

10. The computer system of claim 8, wherein the at least one software defined network switch has a first plurality of quality of service attributes corresponding to the first gateway node and a second plurality of quality of service attributes corresponding to the second gateway node.

11. The computer system of claim 10, wherein reconfiguring the at least one software defined network switch comprises setting the second plurality of quality of service attributes to match the first plurality of quality of service attributes.

12. The computer system of claim 8, wherein the instructing a file system to capture the plurality of attributes associated with the plurality of data following the failover event comprises triggering the capture of the plurality of attributes in response to the failover event.

13. The computer system of claim 8, wherein the failover event comprises the file system reassigning the fileset from the first gateway node to the second gateway node.

14. The computer system of claim 9, wherein the determining if the second gateway node is a part of the virtual local area network comprises obtaining a list of gateway nodes associated with the virtual area network and searching the list of gateway nodes for the second gateway node identifier.

15. A computer program product for automatic network reconfiguration associated with a failover event performed by a software defined network (SDN) controller, comprising:
one or more non-transitory computer-readable storage medium and program instructions stored on at least one of the one or more tangible storage medium, the program instructions executable by a processor, the program instructions comprising:

instructing a file system to capture a plurality of attributes associated with a plurality of data following the failover event, wherein the plurality of attributes comprises a fileset identifier associated with a fileset, a first gateway node identifier associated with a first gateway node, and a second gateway node identifier associated with a second gateway node, and wherein the first gateway node and the second gateway node are part of a node cluster;

determining, based on the captured fileset identifier, a virtual local area network (VLAN) associated with the fileset, wherein the determined virtual local area network connects the first gateway node to the second gateway node within the node cluster;

obtaining a software defined network (SDN) switch list from the SDN controller based on the determined virtual local area network, wherein the SDN switch list corresponds to at least one software defined network switch within the determined virtual local area network, and wherein the at least one software defined network switch is configured by the SDN controller; and sending a reconfiguration command to the SDN controller from a program layer, wherein the reconfiguration command instructs the SDN controller to reconfigure the at least one software defined network switch corresponding to the obtained SDN switch list to stop sending a plurality of network traffic to the first gateway node corresponding to the first gateway node identifier and to start sending the plurality of network traffic to the second gateway node corresponding to the second gateway node identifier, and wherein the plurality of network traffic is associated with the fileset.

16. The computer program product of claim 15, further comprising:
determining if the second gateway node is a part of the virtual local area network associated with the fileset; and
adding the second gateway node to the virtual local area network associated with the fileset.

17. The computer program product of claim 15, wherein the at least one software defined network switch has a first plurality of quality of service attributes corresponding to the first gateway node and a second plurality of quality of service attributes corresponding to the second gateway node.

18. The computer program product of claim 17, wherein the program instructions to reconfigure the at least one software defined network switch comprises setting the second plurality of quality of service attributes to match the first plurality of quality of service attributes.

19. The computer program product of claim 15, wherein the program instructions to instruct a file system to capture the plurality of attributes associated with the plurality of data following the failover event comprises triggering the capture of the plurality of attributes in response to the failover event.

20. The computer program product of claim 15, wherein the failover event comprises the file system reassigning the fileset from the first gateway node to the second gateway node.

* * * * *